US008325233B2

(12) United States Patent
Chiang

(10) Patent No.: US 8,325,233 B2
(45) Date of Patent: Dec. 4, 2012

(54) VIDEO RADAR DISPLAY SYSTEM

(76) Inventor: Yan-Hong Chiang, Taipei (TW)

( * ) Notice: Subject to any disclaimer, the term of this patent is extended or adjusted under 35 U.S.C. 154(b) by 245 days.

(21) Appl. No.: 12/860,860

(22) Filed: Aug. 21, 2010

(65) Prior Publication Data
US 2012/0044353 A1    Feb. 23, 2012

(51) Int. Cl.
H04N 7/18    (2006.01)
(52) U.S. Cl. .......................... 348/149; 382/104
(58) Field of Classification Search .................. 348/149; 382/104
See application file for complete search history.

(56) References Cited

U.S. PATENT DOCUMENTS

| | | | |
|---|---|---|---|
| 6,233,523 B1 * | 5/2001 | Sood | 701/409 |
| 8,081,215 B2 * | 12/2011 | Kuo et al. | 348/169 |
| 2006/0093190 A1 * | 5/2006 | Cheng et al. | 382/115 |
| 2006/0238626 A1 * | 10/2006 | Steiner | 348/231.6 |
| 2009/0091620 A1 * | 4/2009 | Anderson | 348/159 |
| 2011/0187678 A1 * | 8/2011 | Salaverry et al. | 345/175 |

* cited by examiner

Primary Examiner — David Lazaro
Assistant Examiner — Marie Georges Henry
(74) Attorney, Agent, or Firm — Lin & Associates IP, Inc.

(57) ABSTRACT

A video radar display system is provided. The video radar display system includes a camera array, an image processing unit, and a display unit. The camera array includes a plurality of cameras individually positioned for photographing a plurality of images from a plurality of different directions. The image processing unit receives the photographed images from the camera array for conducting an object recognition process, and referring to an object database to reconstruct an environment, so as to generate object display information. The display unit receives the object display information and displays an image according to the received object display information, or project the image to a monitor or head-up display for displaying. The cameras of the camera array are dual-lens cameras or tri-lens cameras. Specifically, the dual-lens camera has two lenses horizontally provided for capturing two images at the same time for determining the distance.

8 Claims, 9 Drawing Sheets

VIDEO RADAR DISPLAY SYSTEM

BACKGROUND OF THE INVENTION

1. Field of the Invention

The present invention relates generally to a video radar display system, and more particularly to a video radar display system adapted for displaying multiple images captured from different directions in an integrated picture.

2. The Prior Arts

It is always very much desired to further improve the driving safety. Some car manufacturers developed to employ infrared (IR) ray, supersonic radar, microwave, or radio frequency wave to detect obstructions nearby the vehicle, so as to alert the driver to pay attention to dangerous road conditions. Such systems include the ACC system for TOYOTA Camry series designed for alerting the front side collision, and the Side Assist System for AUDI series designed for left or right turn alert.

However, it is known that the IR ray and supersonic radar are featured with a small detection range and short application distance, and are likely to be disturbed, while when microwave or radio frequency wave is used for detecting a large range, the transmitting power must be much greater, which is not only harmful for human being therearound, but also very expensive.

Further, a typical central control system of a relative advanced car is often optionally capable of displaying images of front side, rear side, left side and right side of the vehicle on a display positioned at a front right side of the driver's seat for providing more driving information to the driver. However, in this situation, the driver has to intermittently view three rear-view/side mirrors and a display, and this is particularly difficult or even risky for a fresh driver or a slow-responsive driver. As such, a video radar display system adapted for displaying multiple images captured from different directions in an integrated picture is desired.

In such a video radar display system, all images which are conventionally viewed from the rearview/side mirrors are integrally displayed in a single picture frame, and viewing rearview/side mirrors when driving a car is not necessary. The present invention employs cheap photographing equipment, e.g., CCD or CMOS, to construct a radar system which is harmless to human being's body (e.g., no energy radiation), less power consumption, and cheap.

SUMMARY OF THE INVENTION

Accordingly, a primary objective of the present invention is to provide a video radar display system, adapted for displaying all desired environmental conditions in a single picture frame. The video radar display system includes a camera array, an image processing unit, and a display unit. The camera array includes a plurality of cameras individually positioned for photographing a plurality of images from a plurality of different directions. The image processing unit receives the photographed images from the camera array for conducting an object recognition process, and referring to an object database to reconstruct an environment, so as to generate object display information. The display unit receives the object display information and displays an image according to the received object display information, or project the image to a head-up display for displaying. The cameras of the camera array are dual-lens cameras or tri-lens cameras. Specifically, the dual-lens camera has two lenses horizontally provided for capturing two images at the same time. The two images have a distance-related visual difference (parallax), according to which a computer system can determine a distance of the object in the images. The tri-lens camera has three lenses, two of which are horizontally provided for capturing two images at the same time as those of the dual-lens camera, and the rest one of which is vertically provided, for generating an image having a height-related visual difference, according to which the computer system can determine a height of the object.

A plurality of images captured from different directions are integrated in a single picture frame to be displayed on a display, in which only those objects should be noticed by the user are displayed while unimportant image information is neglected. In such a way, the complexity of the images displayed on the display is very much simplified, so that it is more convenient for the user to judge the environmental condition. Accordingly, the present invention is particularly adapted for providing sufficient driving information to car driver or airplane pilot, so as to help them to achieve a better driving safety. Further, the present invention is also adapted for providing spatial information of environmental objects to security monitoring units of a building, square or a freeway, or even the coast patrol for improving the efficiency of monitoring.

Therefore, the video radar display system can be applied in monitoring equipment, cars, boats, ships, airplanes, trains, or a large-scale monitoring system for monitoring a prison, square, freeway, or a coast. This allows the user to monitor dynamic environmental variations by viewing an integrated image.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
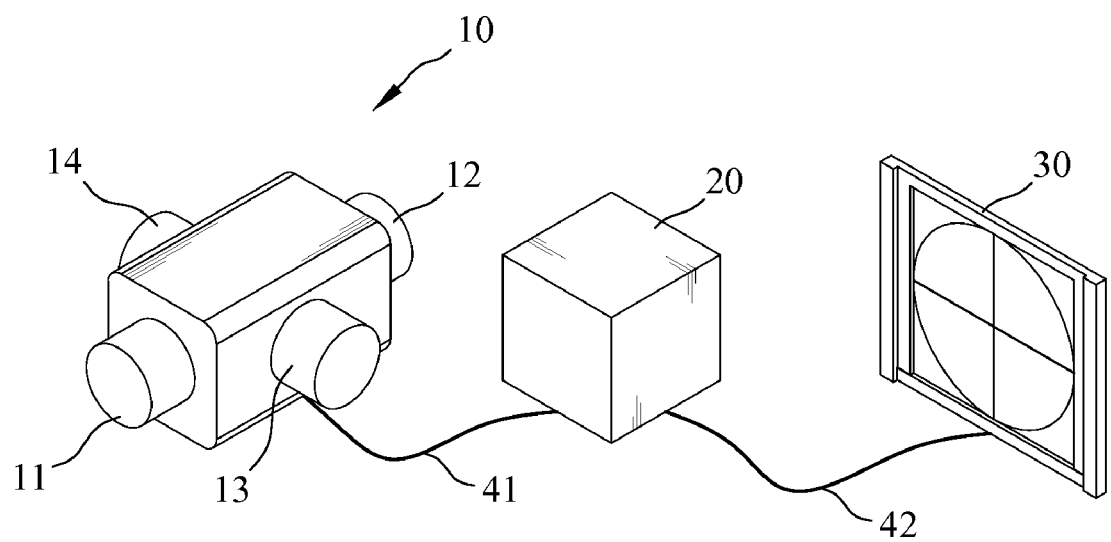
FIG. 1 is a schematic view of a video radar display system according to an embodiment of the present invention.

The accompanying drawings are included to provide a further understanding of the invention, and are incorporated in and constitute a part of this specification. The drawing illustrates embodiments of the invention and, together with the description, serves to explain the principles of the invention.

FIG. 1 is a schematic view of a video radar display system according to an embodiment of the present invention. Referring to FIG. 1, the video radar display system includes a camera array 10, an image processing unit 20, and a display unit 30. The camera array 10 is adapted for photographing toward different directions of the environment so as to capturing a plurality of environmental images. The image processing unit 20 receives the environmental images via a first transmission medium 41 for conducting a process of object recognition, object database connection and environmental reconstruction, for generating an environmental image data. The display unit 30 receives the environmental image data via a second transmission medium 42, and displays an integrated picture containing the environmental image data.

The first transmission medium 41 and the second transmission medium 42 can be either wired transmission media (including RS232, Universal Serial Bus, or Ethernet network), or wireless transmission media (including IrDA (Infrared Data Association) protocol, Radio Frequency Bluetooth protocol, or WIFI/WIMAX/3G/LTE transmission).

The camera array 10 includes a plurality of cameras. As shown in FIG. 1, the camera array 10 is constituted of a first camera 11, a second camera 12, a third camera 13, and a fourth camera 14, adapted for photographing four directions of the environment, e.g., front side, rear side, left side, and right side, so as to capture images thereof. The first camera 11, the second camera 12, the third camera 13, and the fourth camera 14 can be individually disposed, or integrally disposed as a single module.

Figure 2:
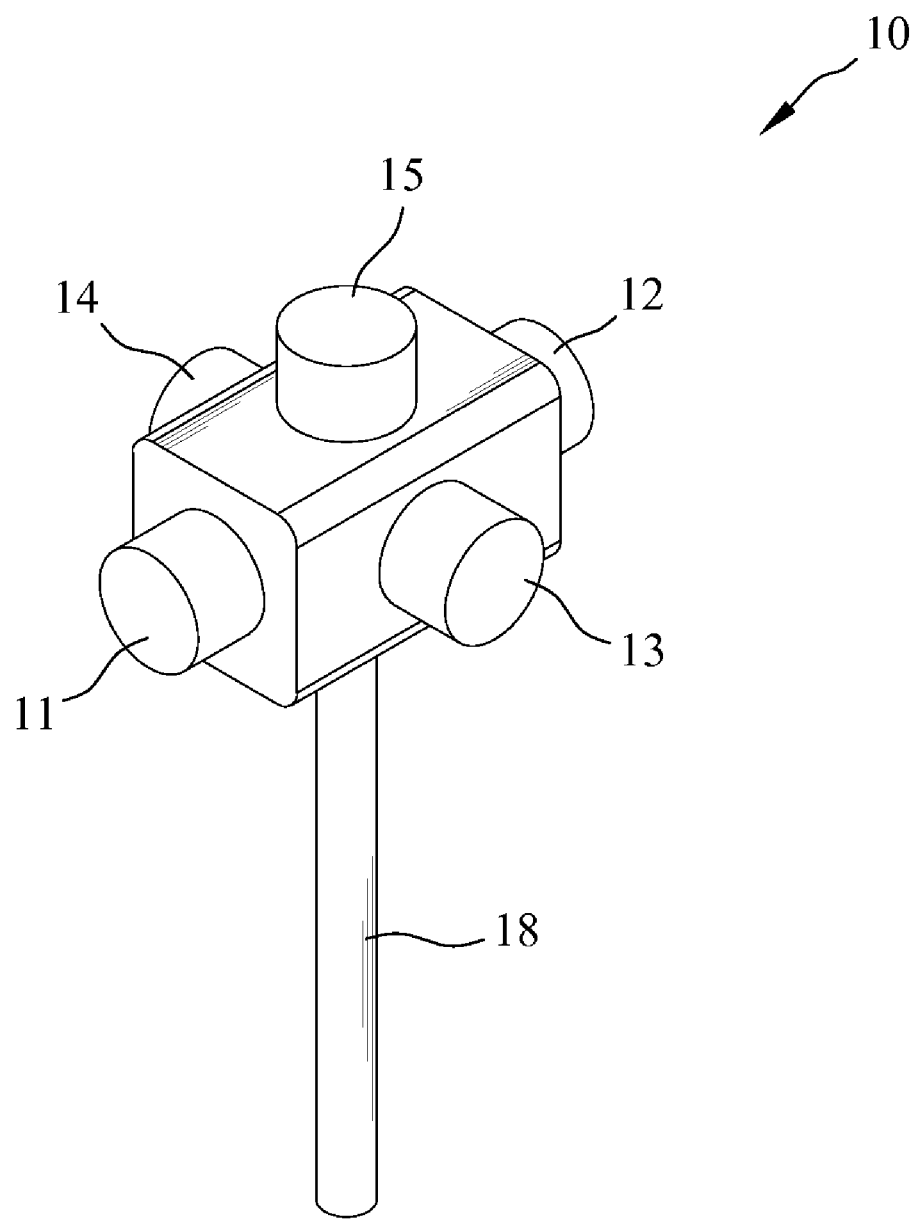
FIG. 2 illustrates a camera array of the video radar display system according to an embodiment of the present invention.

FIG. 2 illustrates a camera array of the video radar display system according to an embodiment of the present invention. Referring to FIG. 2, the camera array 10 further includes a fifth camera 15. The fifth camera 15 is provided for photographing an upper side of the environment and capturing an image thereof. Alternatively, the fifth camera 15 can also be provided for photographing a lower side of the environment. For example, when the camera array 10 is equipped on an airplane, the fifth camera 15 can be equipped at a position nearby the belly of the airplane for photographing the ground of the environment. Meanwhile, as shown in FIG. 2, a pole or base 18 is preferably provided, on which the camera array 10 can be secured. In such a way, the camera array 10 can be installed in a variety of areas, e.g., car, boat, airplane, building, square or road intersection.

Figure 3:
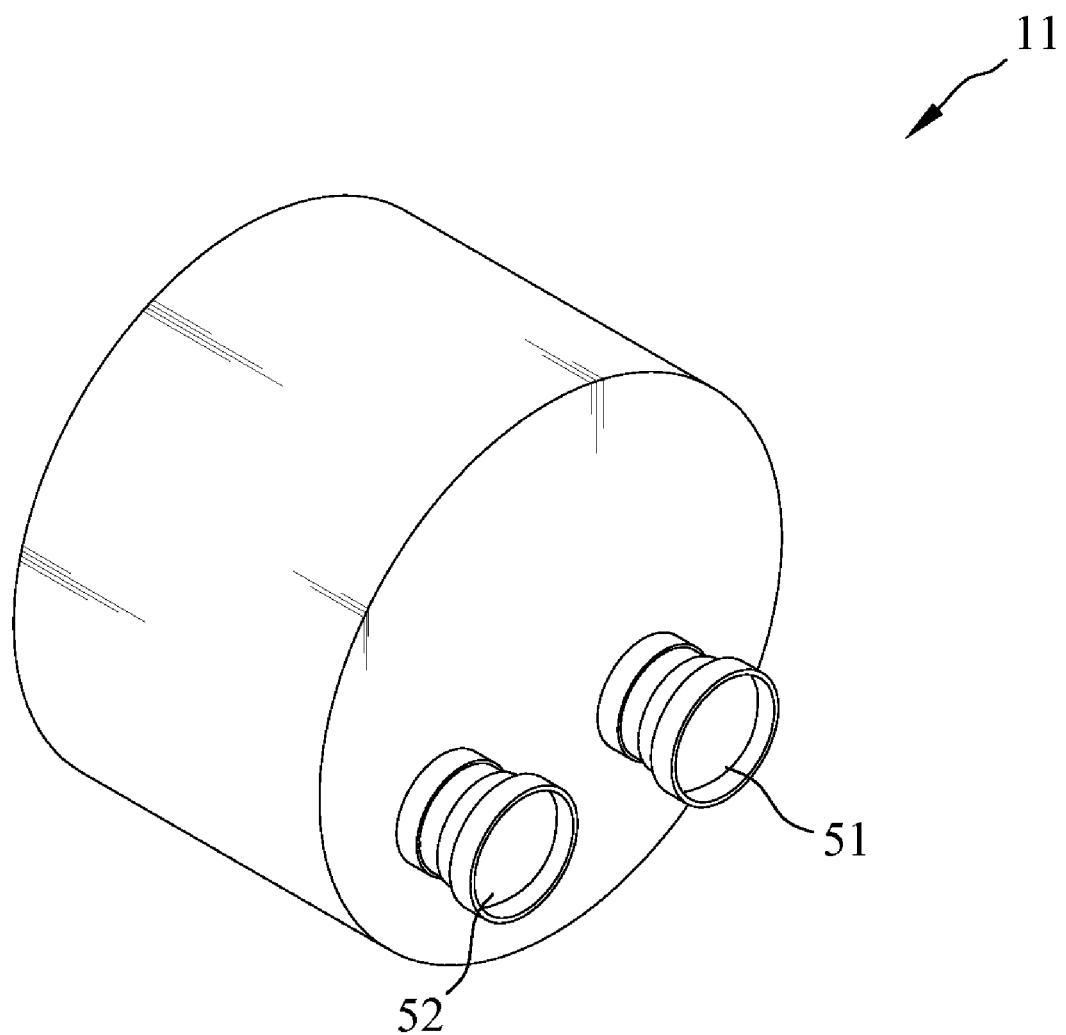
FIG. 3 is a schematic diagram illustrating a camera according to an embodiment of the present invention.

FIG. 3 is a schematic diagram illustrating a camera according to an embodiment of the present invention. Referring to FIG. 3, each camera of the camera array 10, e.g., the first camera 11, includes a first lens 51 and a second lens 52. As shown in FIG. 3, the first lens 51 and the second lens 52 are horizontally arranged for capturing a first environmental image and a second environmental image at the same time, respectively. There is a horizontal visual difference (parallax) between the first environmental image and the second environmental image, according to which a distance of a specific object photographed in the first environmental image and the second environmental image to the camera array 10 can be determined.

Figure 4:
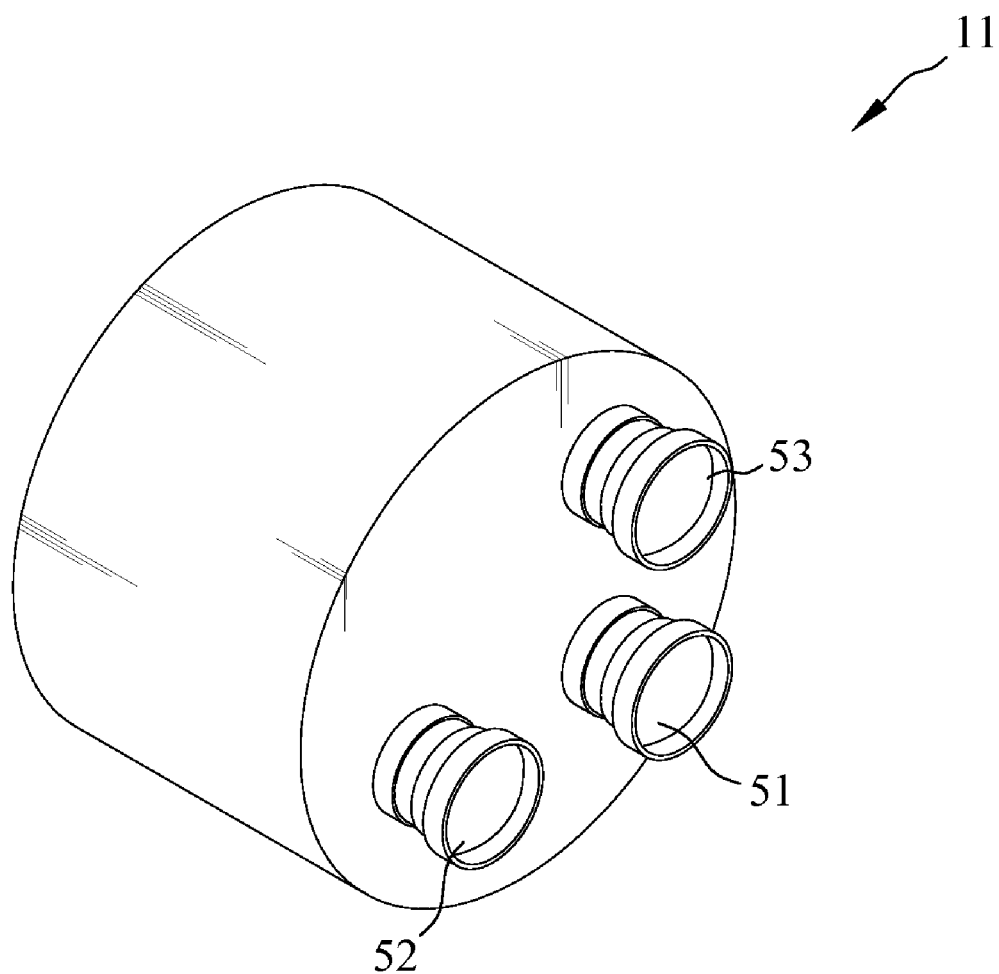
FIG. 4 is a schematic diagram illustrating a camera according to another embodiment of the present invention.

FIG. 4 is a schematic diagram illustrating a camera according to another embodiment of the present invention. Referring to FIG. 4 in comparison with FIG. 3, the first camera 11 is preferred further including a third lens 53 positioned at a direct upper side of the first lens 51 for generating a third environmental image. There is a vertical visual difference between the first environmental image and the third environmental image, according to which a vertical height of the specific object photographed in the first environmental image and the third environmental image to the camera array 10 can be determined. For example, when such a camera array 10 is equipped on a car, it can be used to detect a height of a passing channel under a bridge.

Furthermore, the camera array 10 can be further provided with a fisheye lens for enlarging the detecting range, e.g., enlarging a viewing angle to 140° or even 180°. Moreover, a zoom lens or a long focus lens may also be further provided for improving the detecting distance.

Figure 5:
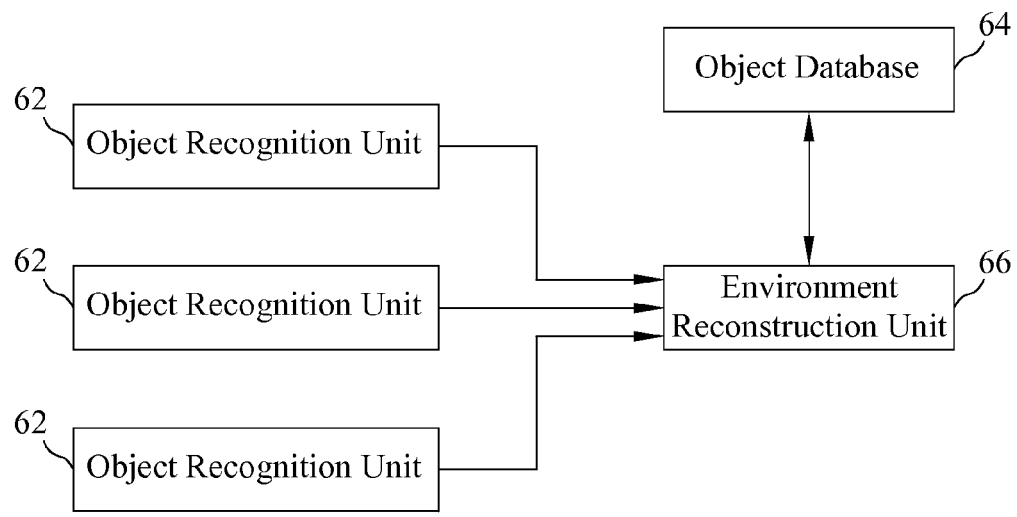
FIG. 5 is a schematic diagram illustrating the functions of the image processing unit according to an embodiment of the present invention.

FIG. 5 is a schematic diagram illustrating the functions of the image processing unit according to an embodiment of the present invention. Referring to FIG. 5, the image processing unit 20 includes a plurality of object recognition units 62, an object database 64, and an environment reconstruction unit 66. Each of the object recognition units 62 is coupled to a corresponding one of the cameras of the camera array 10 for receiving the environmental image captured thereby, and conducting a recognition process to recognize at least one object and determine the type, moving direction, distance, and height of the object, and further generating an object data including the information of the type, moving direction, distance, and height of the object.

Further, when the object recognition unit 62 conducts the recognition process, it is preferred to conduct an object filtering process at the same time, in which any undesired object is neglected and only desired object is adopted in accordance with users' preference. For example, when the present invention is applied in a vehicle, the object filtering process can be set to exclude or neglect far buildings or objects in the air, e.g., birds or airplanes, and stay concentrated on vehicles, pedestrians, traffic signs, and obstacles. Alternatively, when the present invention is applied in an airplane serving as a monitoring radar, it is desired to pay attention to objects including airplanes, missiles, mountains, and exclude birds and clouds. When the present invention is applied in monitoring people's entry and exit, then only human objects are necessary to be selected, while the rest objects should be neglected.

The object database 64 contains built-in data related to different objects, such as appearance features, representation symbols. The built-in data related to the objects can be provided to the environment reconstruction unit 66 for reference. For example, the built-in data related to the objects includes length-width-height ratios of motorcycles, automobiles, trucks, buses, and trailers, and symbols representing a motorcycle, an automobile, a truck, a bus, or a trailer. The environment reconstruction unit 66 receives the object data generated by the object recognition units 62, and then combines all objects into the environment in further accordance with related built-in data in the object database 64, thus generating an environmental image data.

The display unit 30 may be a liquid crystal display (LCD), an organic light emitting diode (OLED) display, a transparent LCD, or a head-up display.

The single picture frame of the display unit 30 is featured with an integration function, i.e., all desired objects are displayed in the single picture frame, while the upper area, the lower area, the left area, and the right area of the single picture frame (e.g., a rectangular shaped displaying area) respectively correspond to the front side, the rear side, the left side and the right side of the environment relative to the camera array 10. Alternatively, the single picture frame can also be configured with a round shaped displaying area divided into four quadrant sub-frames including a first quadrant sub-frame, a second quadrant sub-frame, a third quadrant sub-frame, and a fourth quadrant sub-frame. The first quadrant sub-frame, the second quadrant sub-frame, the third quadrant sub-frame, and the fourth quadrant sub-frame are respectively positioned at an upper right side, a lower right side, a lower left side, and an upper left side of the single picture frame by which the user can conveniently learn the direction and distance of the object's position.

For better illustrating the characteristics of the video radar display system of the present invention, more exemplified embodiments illustrating the application of the present invention on automobiles are to be given in more details herebelow.

According to one embodiment of the present invention, the cameras of the camera array 10 can be together equipped on the top of the automobile and positioned toward the front side, the rear side, the left side, and the right side of the automobile respectively. According to an alternative embodiment of the present invention, the cameras of the camera array 10 can be equipped at the front side, the rear side, the left side, and the right side of the automobile respectively, for photographing the environmental images from the front side, the rear side, the left side, and the right side of the automobile respectively at the same time.

The object recognition unit 62 is adapted for recognizing objects including cars, pedestrians, motorcycles, bicycles, buses, trucks, buildings, road lamps, traffic lights, traffic lane lines, sidewalks, guardrails, safety islands, and any other obstacles which may be found on the road and relate to driving safety, e.g., roadblocks.

The object recognition unit 62 can be configured as an embedded system built with a digital signal processor (DSP) or system on chip (SOC), such as an embedded system provided by Marvell, or Freescale or Texas Instrument. The object recognition unit 62 can also be integrated into the camera array 10 and combined with the camera to constitute a single module therewith.

According to the object type information of the object data generated by the object recognition unit 62, the environmental reconstruction unit 66 retrieves the appearance features of the corresponding object for comparison, thus obtaining a representation symbol which is most matched with the object, such as a symbol representing a car, a truck, a motorcycle, or a pedestrian. Meanwhile, the rest object data such as the direction, distance or height of the object is integrated to generate an environmental image data. In other words, the environmental image data includes the object in the environment, and the direction, distance, or height of the object, for depicting the relative direction, position, or relative height.

Figure 6:
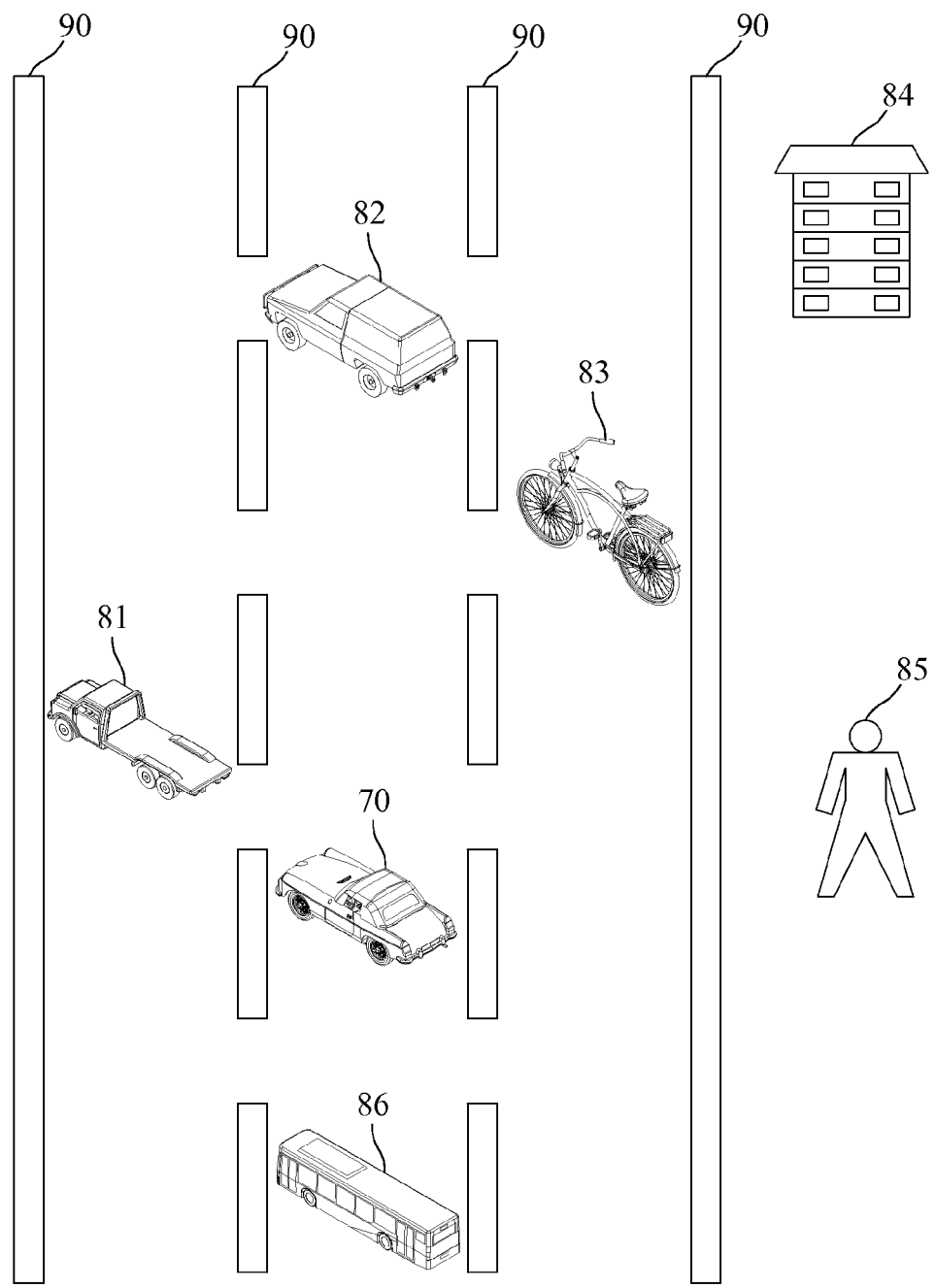
FIG. 6 is a schematic diagram illustrating a single picture frame of a display unit of the video radar display system according to an embodiment of the present invention.

FIG. 6 is a schematic diagram illustrating a single picture frame of a display unit of the video radar display system according to an embodiment of the present invention. Referring to FIG. 6, when the video radar display system is installed in a host automobile 70, and the automobile 70 is being driven in the second lane of a one-way road. As shown in FIG. 6, there is a truck 81 driven in the first lane positioned at the front-left side of the automobile 70 and 10 meters away from the automobile 70, there is an automobile 82 driven in front side of the host automobile 70 distant away about 40 meters, there is a motorcycle 83 driven in the third lane at the front right side of the host automobile 70 distant away about 25 meters, there is a 30-meters high building 84 located at the front right side of the host automobile 70, there is a pedestrian 85 walking on the sidewalk at the right side of the host automobile 70 distant away for about 30 meters, and there is a bus 86 driven at the rear side distant away for about 15 meters. Further, traffic lane lines 90 of the one-way road are also illustrated in the picture frame, for depicting the dynamic relative positions of the objects. Specifically, the single picture frame of the present invention is capable of providing simple and clear road condition to the driver for reference for improving the driving safety.

Figure 7:
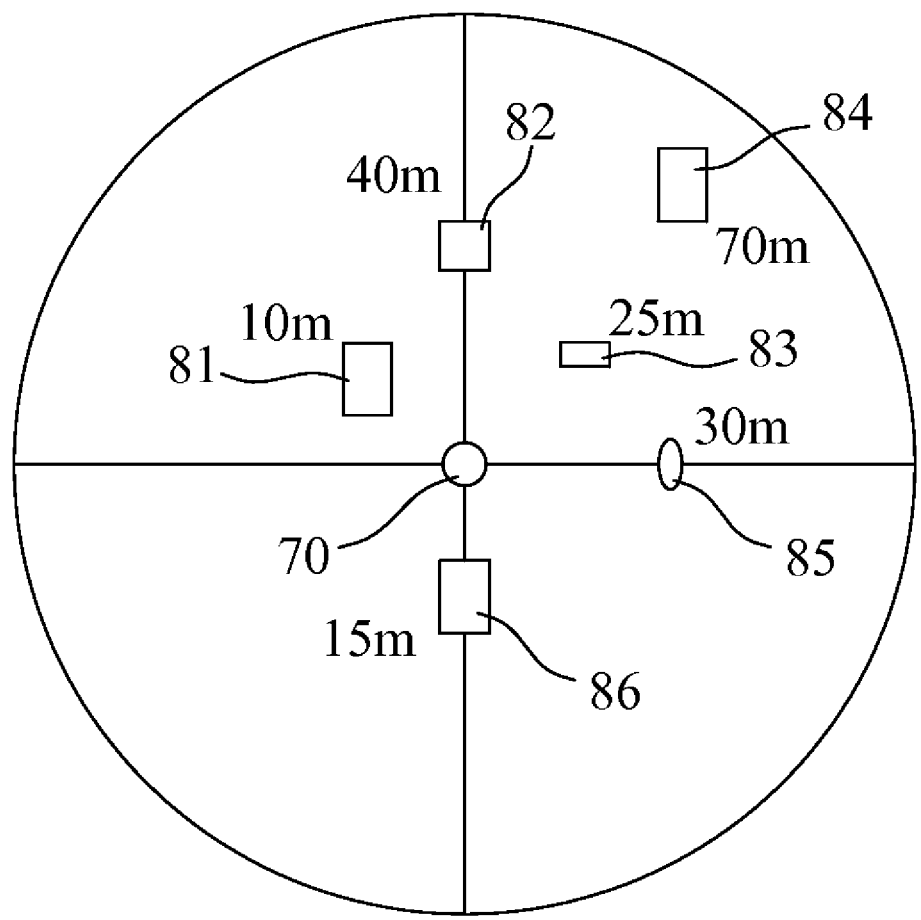
FIG. 7 is a schematic diagram illustrating a single picture frame of a display unit of the video radar display system according to another embodiment of the present invention.

FIG. 7 is a schematic diagram illustrating a single picture frame of a display unit of the video radar display system according to another embodiment of the present invention. Referring to FIG. 7, the single picture frame is presented with a four quadrant configuration, and a set of object symbols (e.g., circles, rectangular, and squares) are used for representing different objects on the road. For example, as shown in FIG. 7, the circle positioned in the center represents the host automobile 70, and distances of other objects to the host automobiles are also provided corresponding to each object symbol. For example, the automobile 82 at the front side distant away about 40 meters is represented as a combination of numerals and units, i.e., "40 m", from which the driver can conveniently understand the relative positions and distances thereof away from the host automobile 70 of different objects.

It should be noted that the single picture frame exemplified in FIGS. 6 and 7 are depicted for illustrating the present invention without restricting the scope seeking for protection. In fact, other symbols such as triangles, polygons, concentric circles, fan-shapes, or any other representative symbols can be used for representing the objects. Further, the distance of the objects to the host automobile can be alternatively represented by hue of colors.

Further, the host automobile 70 discussed in the foregoing embodiments is a moving car. As such, the relative positions of the objects to the host automobiles 70 in FIGS. 6 and 7 are varying, during which the numerals corresponding to the distances are also refreshing. Therefore, non-moving objects are shown as moving backward when the host automobile moves forward, and when the host automobile moves backwards, the non-moving objects are shown as moving forward. Accordingly, the driver can conveniently learn the accurate dynamic traffic situation and environmental road condition by referring to the positions and distances reflected in the single picture frame.

According to a further embodiment of the present invention, the video radar display system is installed at four sides of a building for monitoring purpose and showing a single picture frame to the security or safety guards. Such a single picture frame is capable of reflects all desired environmental objects of the front side, the rear side, the left side, and the right side. In the single picture frame, the building itself is located in the center of the picture frame, and therefore the upper area, the lower area, the left area, and the right area of the single picture frame correspondingly reflect the environmental situation of the front side, the rear side the left side, and the right side of the building. Therefore, the building installed with the video radar display system of the present invention allows the users to conveniently go through the situation of the environment, e.g., whether there is an unauthorized visitor. In such a way, the user does not need to view different images in different frames, or partitioned frames while remembering the real position of each representative image as required by conventional technologies.

Figure 8:
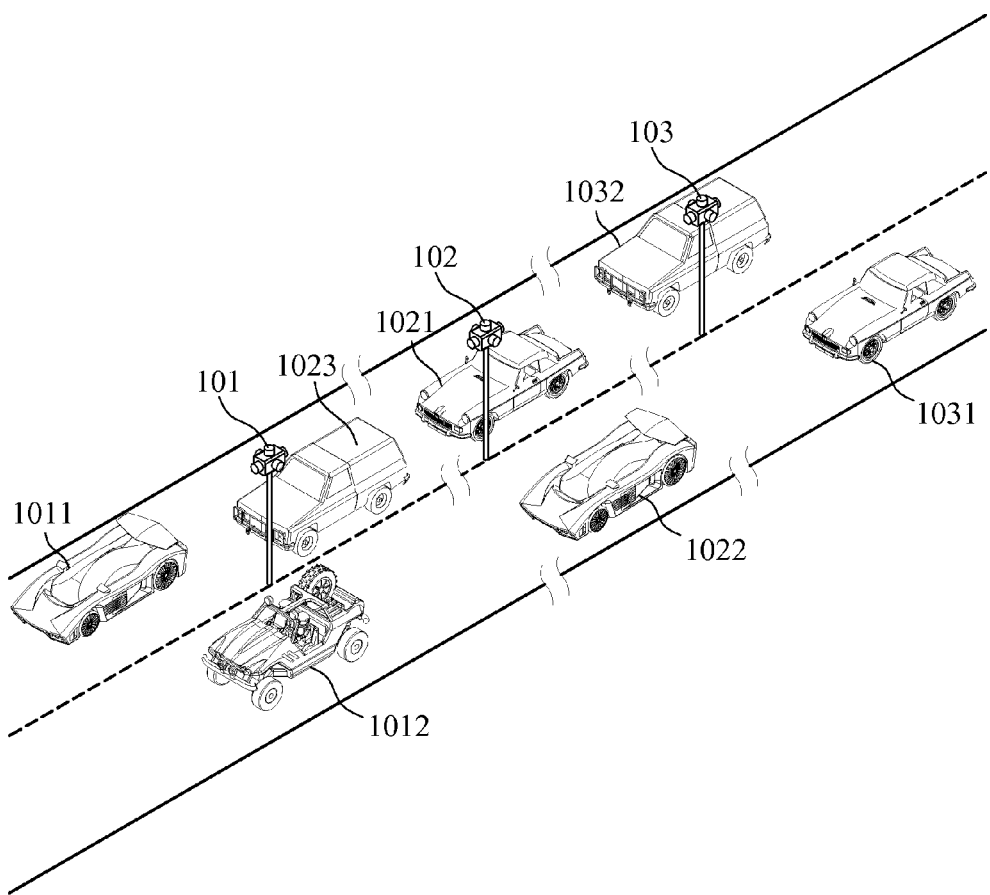
FIG. 8 illustrates the operational application of the video radar display system according to an embodiment of the present invention.
Figure 9:
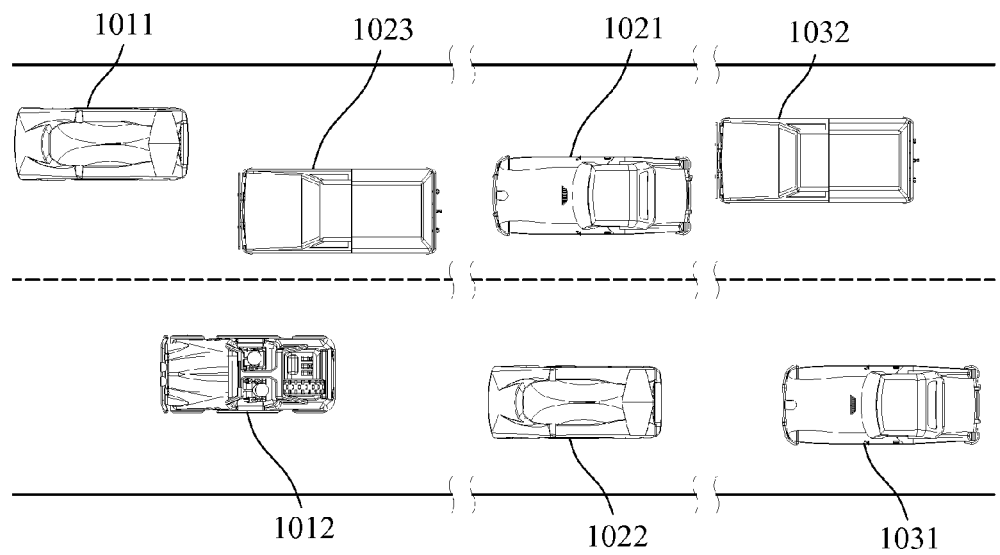
FIG. 9 illustrates the single picture frame of the embodiment shown in FIG. 8.

In accordance with a further embodiment of the present invention, the video radar display system may include a plurality of camera arrays for monitoring a larger area. FIG. 8 illustrates the operational application of the video radar display system according to an embodiment of the present invention. FIG. 9 illustrates the single picture frame of the embodiment shown in FIG. 8. As shown in FIG. 8, the video radar display system includes three camera arrays 101, 102, and 103. Each of the camera arrays 101, 102, and 103 has a monitoring area which is non-overlapped with monitoring areas of the other camera arrays. Specifically, the camera arrays 101, 102, and 103 are arranged along a road. For example, the camera array 101 is capable of detecting two objects 1011 and 1012 only. The camera array 102 is capable of detecting three objects 1021, 1022, and 1023 only. The camera array 103 is capable of detecting two objects 1031 and 1032 only. All objects shown in FIG. 8 are different vehicles moving on the road in different lanes. Data related to the objects are transmitted to the environment reconstruction unit and integrated thereby, and then the integrated data is transmitted to the display unit and displayed in the single picture frame as shown in FIG. 9. In such a way, the administration staff of the road is allowed to monitor a greater area by viewing the single picture frame. The integrated environmental data can be further modified and wirelessly transferred to the object 1021, i.e., a moving vehicle driving on the road, so as to allow the driver of the object 1021 to learn the environmental road condition monitored by the camera array 102.

The present invention is featured in that the monitored objects are represented with representative symbols in the single picture frame, rather than displayed with real photographed image as conventional technology does. In such a way, the video radar display system removes unnecessary objects or incorrect images, to help keeping the driver concentrated on the necessary objects. For example, when applied for monitoring the entry and exit of human being, small animals or birds can be pre-excluded and not displayed in the single picture frame, thus decreasing the working load of the user and improving the entire monitoring efficiency.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A video radar display system comprising:
   a camera array, comprising a plurality of cameras, wherein the cameras are discretely disposed or integrated as a module, and the cameras are positioned for photographing toward different directions to obtain a plurality of environmental images of an environment at the same time;
   an image processing unit, coupled to the camera array via a first transmission medium for receiving the environmental images therefrom, the image processing unit comprises:
      a plurality of object recognition units, each of the object recognition units receiving corresponding environmental images from a corresponding one of the cameras, and conducting an object recognition process to recognize at least one object and a relative position thereof and generating an object data related to the recognized object;
      an object database, containing data related to the at least one recognized object, the data related to the at least one recognized object comprising at least an appearance feature and a representative symbol corresponding to the recognized object; and
      an environment reconstruction unit, receiving the object data generated by the plurality of object recognition units and generating an environmental image data by combining the recognized objects in the received object data into the environment and referring to the data contained in the object database; and
   a display unit, coupled to the image processing unit via a second transmission medium for receiving the environmental image data and displaying a single picture frame, wherein each recognized object is displayed with a representative symbol in the single picture frame which is not a photographed real image of the recognized objects, and the representative symbol is displayed at a corresponding position in the single picture frame in accordance with the relative position of the recognized object, wherein an upper area, a lower area, a left area, and a right area are respectively corresponded to a front side, a rear side, a left side and a right side of the environment.

2. The video radar display system as claimed in claim 1, wherein each of the cameras comprises a first lens and a second lens which are substantially horizontally disposed, wherein each environmental image comprises a first lens environmental image obtained by the first lens and a second lens environmental image obtained by the second lens, wherein there is a horizontal visual difference between the first lens environmental image and the second lens environmental image according to which a distance of the recognized object can be determined, wherein the distance is contained in the environmental image data and transmitted to the display unit, and is displayed in the single picture frame in a manner of a combination of a numeral and a unit.

3. The video radar display system as claimed in claim 1, wherein each of the cameras comprises a first lens and a second lens which are substantially horizontally disposed, and a third lens which is substantially vertically disposed, wherein each environmental image comprises a first lens environmental image obtained by the first lens, a second lens environmental image obtained by the second lens, and a third lens environmental image obtained by the third lens, wherein there is a horizontal visual difference (parallax) between the first lens environmental image and the second lens environmental image according to which a distance of the recognized object can be determined, and there is a vertical visual difference (parallax) between the first lens environmental image and the third lens environmental image according to which a height of the recognized object can be determined, wherein the distance and the height of the recognized object are contained in the environmental image data and transmitted to the display unit, and are displayed in the single picture frame in a manner of a combination of a numeral and a unit.

4. The video radar display system as claimed in claim 1, wherein the single picture frame is a round shaped picture frame partitioned into four quadrant sub-frames comprising a first quadrant sub-frame, a second quadrant sub-frame, a third quadrant sub-frame, and a fourth quadrant sub-frame, which are respectively positioned at an upper right side, a lower right side, a lower left side, and an upper left side of the round shaped picture frame.

5. The video radar display system as claimed in claim 1, wherein the first transmission medium and the second transmission medium are wired transmission media or wireless transmission media, wherein the wired transmission media comprises RS232, Universal Serial Bus, or Ethernet network, and the wireless transmission media comprises IrDA (Infrared Data Association) protocol, Radio Frequency Bluetooth protocol, or WIFI/WIMAX/3G/LTE transmission.

6. The video radar display system as claimed in claim 1, wherein the display unit is a liquid crystal display (LCD), an organic light emitting diode (OLED) display, a transparent LCD, or a head-up display.

7. The video radar display system as claimed in claim 1, wherein each of the object recognition units further conducts an object filtering process to ignore undesired objects when the object recognition process is conducted.

8. The video radar display system as claimed in claim 1, wherein the object data generated by the object recognition process includes the at least one object and relative direction, distance or height of the at least one object for depicting the at least one object in the environment.

* * * * *